United States Patent Office 3,346,587
Patented Oct. 10, 1967

3,346,587
PYRAZOLONE COMPOUNDS
Gordon A. Geselbracht, Charlotte, N.C., assignor to Martin-Marietta Corporation, a corporation of Maryland
No Drawing. Filed Apr. 11, 1966, Ser. No. 541,498
4 Claims. (Cl. 260—310)

ABSTRACT OF THE DISCLOSURE

There are disclosed herein dyestuff intermediates of the general formula

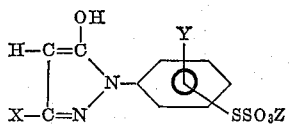

wherein X is the gamma portion of an alpha unsubstituted beta keto acid or alpha unsubstituted beta keto ester; Y is H, halogen, lower alkyl, lower alkoxy, or the radical of a sulfonamide; Z is H, Na, K or NH$_4$; and the —SO$_3$Z is meta or para to the N attached to the benzene nucleus. The method comprises diazotizing

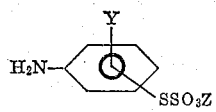

reacting the resulting diazonium compound with an alkali metal sulfite; acidifying the resulting alkali metal phenylhydrozinesulfonate at 0°–35° C. with a strong mineral acid; and condensing equimolar amounts of the resulting hydrazine with an alpha unsubstituted beta keto acid or alpha unsubstituted beta keto ester, in which X, Y, Z and the position of SSO$_3$Z are as above defined.

---

This is a continuation-in-part of my copending United States patent application Ser. No. 383,259, filed July 16, 1964, now abandoned, and the benefit of said filing date is claimed.

The present invention relates to pyrazolone compounds and to the method for making same.

The pyrazolone compounds of the present invention may be represented by the general formula

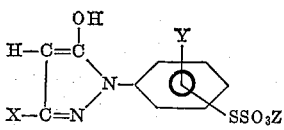

wherein X is the gamma portion of an alpha unsubstituted beta keto ester or the gamma portion of an alpha unsubstituted beta keto acid; Y is hydrogen, lower alkyl, lower alkoxy, or the radical of sulfonamide; Z is H, Na, K, or NH$_4$; and the SSO$_3$Z group is positioned meta or para with respect to the N attached to the benzene nucleus.

The method of the present invention is particularly characterized in that it is a method for making pyrazolone compounds comprising the steps of diazotizing an amine of the formula

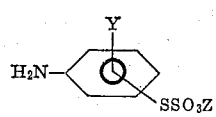

wherein Y and Z are as above defined and the SSO$_3$Z group is meta or para with respect to the N attached to the benzene nucleus; reacting the resulting diazonium compound with an alkali metal sulfite to form an alkali metal phenylhydrazinesulfonate; acidifying the resulting sulfonate at 0°–35° C. with a strong mineral acid to form a hydrazine; and condensing equimolar proportions of the hydrazine and an alpha unsubstituted beta keto ester or an alpha unsubstituted beta keto acid to form a pyrazolone by ring closure.

The compounds of the present invention are particularly valuable and useful as dye intermediates, that is to say that the compounds of the present invention may be reacted with other chemical compounds to form dyes.

It is quite surprising and unexpected that the compounds of the present invention may be synthesized, as one with skill in the art would expect that the notoriously labile SSO$_3$Z of the amine would not remain stable throughout the present process, but would decompose, such as by splitting off an —SO$_3$Z group and forming a mercapto amine, and enter into undesirable side reactions. In fact, the reaction of the present invention does not proceed, and a tarry residue results, if acidification to form the hydrazine is conducted at a temperature above 35° C. Moreover, if one attempts to diazotize ortho-aminothiophenylthiosulfates, the thiosulfate group enters into undesirable side reactions, rendering the process valueless.

A more detailed description follows: A valuable dye intermediate of the formula

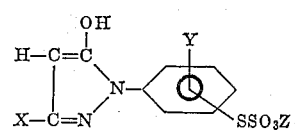

wherein X, Y, and Z are as above defined and the SSO$_3$Z group is meta or para to the N attached to the benzene nucleus, may be prepared as follows.

A molecular proportion of an amine of the formula

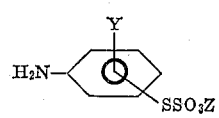

wherein Y and Z are as above defined and the SSO$_3$Z group is metal or para with respect to the N attached to the benzene nucleus, is diazotized by conventional diazotization technique, such as by dissolving the amine in water, cooling to 0° C., acidifying with HCl, and adding NaNO$_2$ at 0°–10° C. as consumed. The corresponding diazonium salt results.

The resulting diazonium salt is reacted with a molecular proportion of an alkali metal sulfite, such as sodium sulfite, potassium sulfite, or caustic plus a bisulfite which react to form the alkali metal sulfite, to produce the corresponding alkali metal phenylhydrazinesulfonate. This reaction may be effected by stirring an aqueous solution of the above diazonium salt with the alkali metal sulfite at 0° –15° C. for 3–10 hours.

The resulting alkali metal phenylhydrazinesulfonate is then converted to the corresponding hydrazine by acidifying with a strong mineral acid, such as H$_2$SO$_4$, HCl, and H$_3$PO$_4$, and preferably H$_2$SO$_4$ for reasons of economy, and maintaining at 0° –35° C. for 12–48 hours; reaction is complete when the SO$_2$ is liberated. Temperature control in the acidification step is important as excessive heat causes decomposition.

The resulting hydrazine is then condensed with a molecular proportion of an alpha unsubstituted beta keto ester or alpha unsubstituted beta keto acid. This condensation may be effected by stirring the reactants at 15°–35° C. for 8–48 hours.

Alpha unsubstituted beta keto esters have the formula $R_1-CO-CH_2-COOR_2$. The $R_1$ is the gamma portion of the ester; the CO is the beta portion of the ester; the $CH_2$ is the alpha portion of the ester; the term alpha unsubstituted refers to the fact that the hydrogens of the $CH_2$ are unsubstituted; and the $COOR_2$ is the carboalkoxy portion of the ester. In these alpha unsubstituted beta keto esters, $R_2$ is an alkyl group and $R_1$ may be carboalkoxy, alkyl, aryl, hydrogen or furyl. Alpha unsubstituted beta keto acids are analogous, except that $R_2$ is H, and except that $R_1$ may also be carboxy.

As a result of the above condensation of the hydrazine and the alpha unsubstituted beta keto ester or acid, the $R_2$ substituent and the adjacent oxygen are split out, along with the amino hydrogens of the hydrazine, to form an $R_2OH$ alcohol and water in the case of the ester, and water in the case of acid, thereby permitting ring closure of the hydrazine and ester or acid, in which the $R_1$ of the ester or acid becomes the X of the pyrazolones of the present invention.

At this stage, the dye intermediates exist in the acid form, and have the formula

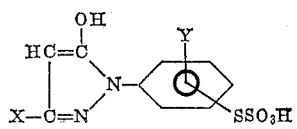

wherein X and Y are as above defined and the $SSO_3H$ group is meta or para to the N attached to the benzene ring.

The above thiosulfuric acid form may be converted to the thiosulfate salt form ($SSO_3Na$, or $SSO_3K$, or $SSO_3NH_4$) by reacting the acid with an alkali salt of Na, K, or $NH_4$, and the resulting thiosulfate salt may be isolated by evaporating to dryness or salting out.

Non-limiting examples of X in the compounds of the present invention are hydrogen; a radical of the benzene series, such as phenyl, chlorophenyl, methoxyphenyl, ethoxyphenyl, nitrophenyl and tolyl; naphthyl; furyl; lower alkoxy carbonyl, such as methoxycarbonyl or ethoxycarbonyl; carboxy; and lower alkyl, such as methyl, ethyl, propyl and isopropyl. Alpha unsubstituted beta keto acids, in which the gamma portion is identical to X, or alpha unsubstituted beta keto esters, in which the gamma portion is identical to X except for carboxy, may be used in the present process.

The pyrazolone compounds of the present invention, in either their acid form ($SSO_3H$) or thiosulfate salt form ($SSO_3Na$, or $SSO_3K$, or $SSO_3NH_4$), may be coupled with an equimolar proportion of a diazonium salt to produce an azo dyestuff. Such diazonium salts are well known, and are prepared by diazotizing a diazotizable amine (azoic base). This coupling may be effected by adding an alkali or acid binding agent to the pyrazolone compound to bind the free acid and adding thereto a diazonium salt. The azo dyestuff results as a solution of the thiosulfate salt, and may be recovered as thiosulfate salt solid by evaporating to dryness or salting out, or recovered as the thiosulfuric acid by rendering the solution slightly acid and collecting the resulting precipitate.

Particularly valuable properties of the dye intermediates of the present invention are that the pendant thiosulfate group serves to render the dyes resulting therefrom water soluble; the thiosulfate group is reducible to the soluble mercaptide form and subsequently oxidizable to the insoluble disulfide form, thus rendering the dyes easily applicable to textiles; and the OH group of the pyrazolone ring is a metallizable substituent, which has great value in dye synthesis.

Thiosulfate form dyes produced from the dye intermediates of the present invention may be applied to cotton fabric by padding onto the fabric at 140° F. a dye solution consisting of 20 parts dye, 100 parts thiourea, 2 parts sodium alginate migration inhibitor, and 878 parts water; squeezing to 60% wet pickup based on fabric weight; pre-drying to 10% moisture content; and heating in a curing oven at 400° F. for 1 minute to fix the dye.

The thiosulfuric acid form dyes of the present invention may be used to dye wool by the commonly known method for applying acid dyes to wool.

The following are illustrative examples of the pyrazolone compounds of the present invention and methods for preparing them.

*Example 1*

The pyrazolone compound of the formula

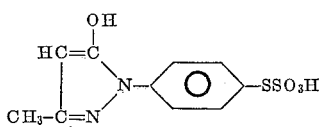

may be prepared as follows.

1 g. M.W. (227 gms.) sodium S-4-aminophenylthiosulfate is diazotized by dissolving in 1,000 ml. $H_2O$ at 35° C., cooling to 0° C., adding 225 gms. 20° Bé. HCl, and adding 69 gms. $NaNO_2$ as consumed. The diazonium salt of sodium S-4-aminophenylthiosulfate results.

A solution of sodium sulfite is prepared by slurrying 230 gms. sodium bisulfite in 500 gms. ice, adding 100 ml. 50% aqueous NaOH, and stirring until the pH adjusts to 7.0. The above resulting diazonium salt of sodium S-4-aminophenylthiosulfate is added to the solution of sodium sulfite gradually during a period of one hour, while maintaining the temperature at 0° C. and the pH at 7.0–7.2 by adding sodium bisulfite or NaOH as needed. The resulting mixture is permitted to stand 12–18 hours, forming a yellowish solution of

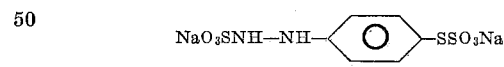

(sodium 4-S-sodiothiosulfatophenylhydrazinesulfonate).

To the above solution of sodium 4-S-sodiothiosulfatophenylhydrazinesulfonate is added, at 20°–25° C., 550 gms. 98% $H_2SO_4$, and the mixture is stirred until all $SO_2$ is liberated, e.g. 20 hours at 20°–30° C. or 48 hours at 0°–10° C., forming

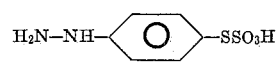

(4-thiosulfatophenylhydrazine).

A slight excess over 1 g. M.W. ethyl acetoacetate is added to the hydrazine, and the mixture stirred 20 hours at 25°–30° C. The resulting solids product is collected by filtration, washed with ice water, and air dried.

In the examples given in the following table, the procedure is the same as that given in Example 1 above, and the examples in the table indicate that a molecular proportion of the thiosulfate salt in the second column is diazotized, the resulting diazo reacted with sodium sulfite and the result acidified to form a hydrazine, and the hydrazine reacted with a molecular proportion of the alpha unsubstituted beta keto ester or acid in the third column to form the pyrazolone compound in the fourth column.

| Ex. No. | Thiosulfate Salt | Ester or Acid | Pyrazolone |
|---|---|---|---|
| 2 | Potassium S-4-aminophenyl-thiosulfate. | Methyl acetoacetate | [structure: pyrazolone with CH$_3$ and phenyl-SSO$_3$H] |
| 3 | Ammonium S-4-aminophenyl-thiolulfate. | Isopropyl acetoacetate | Same as above. |
| 4 | Sodium S-4-aminophenyl-thiosulfate | Butyl acetoacetate | Do. |
| 5 | ___do___ | Acetoacetic acid | Do. |
| 6 | Sodium S-(2-methyl-3-aminophenyl) thiosulfate. | Ethyl propionylacetate | [structure with C$_2$H$_5$ and CH$_3$, SSO$_3$H] |
| 7 | Sodium S-(3-ethyl-4-aminophenyl)-thiosulfate. | Ethyl n-butyrylacetate | [structure with C$_3$H$_7$, C$_2$H$_5$, SSO$_3$H] |
| 8 | Potassium S-(3-methoxy-5-aminophenyl)thiosulfate. | Ethyl benzoylacetate | [structure with OCH$_3$, SSO$_3$H, phenyl] |
| 9 | Sodium S-4-aminophenylthiosulfate | Benzoylacetic acid | [structure with phenyl, SSO$_3$H] |
| 10 | Sodium S-(2-ethoxy-4-aminophenyl) thiosulfate. | Ethyl β-naphthoylacetate | [structure with naphthyl, OC$_2$H$_5$, SSO$_3$H] |
| 11 | Ammonium S-(2-sulfonamido-5-aminophenyl) thiosulfate. | Ethyl 2-furoylacetate | [structure with furyl, SO$_2$NH$_2$, SSO$_3$H] |
| 12 | Sodium S-(2-methylsulfonamido-4-aminophenyl)thiosulfate. | Ethyl p-chlorobenzoyl-acetate. | [structure with Cl-phenyl, SO$_2$NHCH$_3$, SSO$_3$H] |
| 13 | Potassium S-4-aminophenyl thiosulfate. | Ethyl m-chlorobenzoyl-acetate. | [structure with Cl-phenyl, SSO$_3$H] |
| 14 | Sodium S-(3-amino-4-phenylsulfonamidophenyl)thiosulfate. | Ethyl o-anisoylacetate | [structure with OCH$_3$-phenyl, SO$_2$-NH-phenyl, SSO$_3$H] |

| Ex. No. | Thiosulfate Salt | Ester or Acid | Pyrazolone |
|---|---|---|---|
| 15 | Ammonium S-4-aminophenylthiosulfate. | Ethyl p-anisoylacetate. | $CH_3O$—⟨ ⟩—C(=N–N(—⟨ ⟩—$SSO_3H$)—C(OH)=CH) |
| 16 | Sodium S-3-aminophenylthiosulfate. | Ethyl p-toluylacetate. | $CH_3$—⟨ ⟩—C(=N–N(—⟨ ⟩(m-$SSO_3H$))—C(OH)=CH) |
| 17 | Potassium S-4-aminophenylthiosulfate. | Ethyl p-ethoxybenzoylacetate. | $C_2H_5O$—⟨ ⟩—C(=N–N(—⟨ ⟩—$SSO_3H$)—C(OH)=CH) |
| 18 | Sodium S-4-aminophenylthiosulfate. | Ethyl formylacetate. | HC=C(OH)–N(—⟨ ⟩—$SSO_3H$)–N=CH |
| 19 | Sodium S-(3-bromo-4-aminophenyl)thiosulfate. | Methyl oxaloacetate. | $CH_3O$–C(=O)–C(=N–N(—⟨ ⟩(Br, $SSO_3H$))—C(OH)=CH) |
| 20 | Potassium S-(2-fluoro-5-aminophenyl)thiosulfate. | Ethyl oxaloacetate. | $C_2H_5$–O–C(=O)–C(=N–N(—⟨ ⟩(F, $SSO_3H$))—C(OH)=CH) |
| 21 | Sodium S-[4-amino-2(4′-chlorophenylsulfamyl)]phenylthiosulfate. | Methyl acetoacetate. | $CH_3$–C(=N–N(—⟨ ⟩($SO_2$–NH–⟨ ⟩–Cl, $SSO_3H$))—C(OH)=CH) |
| 22 | Sodium S-[4-amino-3(4′-tolylsulfamide)]phenylthiosulfate. | ......do...... | $CH_3$–C(=N–N(—⟨ ⟩($SO_2$–NH–⟨ ⟩–$CH_3$, $SSO_3H$))—C(OH)=CH) |
| 23 | Sodium S-4-aminophenylthiosulfate. | Oxalacetic acid. | HOOC–C(=N–N(—⟨ ⟩—$SSO_3H$)—C(OH)=CH) |
| 24 | ......do...... | Oxalacetic acid ethyl ester. | $C_2H_5$–O–C(=O)–C(=N–N(—⟨ ⟩—$SSO_3H$)—C(OH)=CH) |
| 25 | Sodium S-4-aminophenyl-thiosulfate. | Isobutyrylacetic acid. | ($CH_3$)$_2$CH–C(=N–N(—⟨ ⟩—$SSO_3H$)—C(OH)=CH) |
| 26 | Sodium S-3-aminophenyl-thiosulfate. | p-Nitrobenzoylacetic acid. | $O_2N$—⟨ ⟩—C(=N–N(—⟨ ⟩(m-$SSO_3H$))—C(OH)=CH) |

The products of the above examples are in the thiosulfuric acid form. These acids may be easily converted to their salts by dissolving them in water, reacting with an equivalent amount of an alkali of Na, K, or NH₄ (such as NaOH, Na₂CO₃, KOH, K₂CO₃, NH₄OH, etc.) and evaporating to dryness, in which case the corresponding Na, K or NH₄ ion of the alkali replaces the H atom of the thiosulfuric acid. An illustrative example follows.

*Example 27*

The compound of the formula

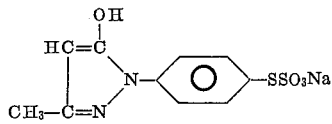

may be prepared by dispersing 1 g. M.W. of the product of Example 1 in 1,000 ml. water at 25° C., adding thereto 0.5 g. M.W. of Na₂CO₃ in aqueous form, stirring, evaporating the resulting salt solution to dryness, and collecting the solids product.

What is claimed is:
1. A pyrazolone compound of the formula

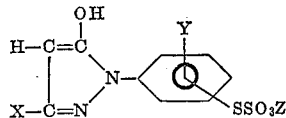

wherein X is hydrogen, phenyl, chlorophenyl, methoxyphenyl, ethoxyphenyl, nitrophenyl, tolyl, naphthyl, furyl, lower alkoxy carbonyl, carboxyl, or lower alkyl; Y is hydrogen, halogen, lower alkyl, lower alkoxy, —SO₂NH₂, —SO₂NHCH₃,

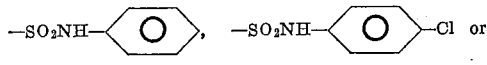

Z is H, Na, K or NH₄; and the SSO₃Z group is positioned meta or para with respect to the N attached to the benzene nucleus.

2. A pyrazolone compound as defined in claim 1, and further characterized in that X is methoxycarbonyl, ethoxycarbonyl, methyl, ethyl, propyl, or isopropyl.

3. A pyrazolone compound as defined in claim 1, and further characterized in that X is methyl, Y is hydrogen, and the SSO₃Z group is para with respect to the N attached to the benzene nucleus.

4. A pyrazolone compound as defined in claim 3, and further characterized in that Z is H.

References Cited

UNITED STATES PATENTS

| | | | |
|---|---|---|---|
| 1,534,512 | 4/1925 | Fritzsche et al. | 260—310 |
| 1,856,413 | 5/1932 | Geller | 260—310 |
| 2,011,256 | 8/1935 | Ostromislensky | 260—310 |
| 2,272,739 | 2/1942 | Dohrn et al. | 260—310 |
| 2,744,911 | 5/1956 | Bolliger | 260—310 |

FOREIGN PATENTS 1,302,321  7/1962  France.

OTHER REFERENCES

Fierz-David et al.: Fundamental Processes of Dye Chemistry (Transl. of 5th Austrian ed.), pages 128–9, New York, Interscience, 1949.

Wiley et al.: Pyrazolones, Pyrazolidones, and Derivatives, pages 9 and 14, New York, Wiley 1964.

WALTER A. MODANCE, *Primary Examiner.*

N. TROUSOF, *Assistant Examiner.*

UNITED STATES PATENT OFFICE
CERTIFICATE OF CORRECTION

Patent No. 3,346,587                  October 10, 1967

Gordon A. Geselbracht

It is hereby certified that error appears in the above numbered patent requiring correction and that the said Letters Patent should read as corrected below.

Column 2, line 53, for "metal" read -- meta --; columns 7 and 8, Ex. No. 22, for "phenylthilsulfate" read -- phenylthiosulfate --; same column, Ex. No. 25, the structural formula should appear as shown below instead of as in the patent:

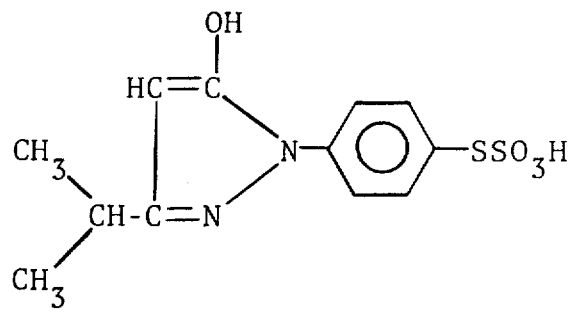

Signed and sealed this 22nd day of October 1968.

(SEAL)
Attest:

EDWARD M. FLETCHER, JR.                EDWARD J. BRENNER
Attesting Officer                       Commissioner of Patents